(12) United States Patent
Coetzee et al.

(10) Patent No.: US 11,528,079 B2
(45) Date of Patent: Dec. 13, 2022

(54) OPTICAL FIBER TESTING DEVICE AND METHOD

(71) Applicant: COMMSCOPE TECHNOLOGIES LLC, Hickory, NC (US)

(72) Inventors: Stefan Coetzee, Wierda Park (ZA); Yu Lu, Eden Prairie, MN (US); Daniel Francois Daems, S-Gravenwezel (BE); Patrick Jacques Ann Diepstraten, Heusden-Zolder (BE); Liming Wang, Shanghai (CN)

(73) Assignee: CommScope Technologies LLC, Hickory, NC (US)

( * ) Notice: Subject to any disclaimer, the term of this patent is extended or adjusted under 35 U.S.C. 154(b) by 68 days.

(21) Appl. No.: 16/753,503

(22) PCT Filed: Jun. 25, 2018

(86) PCT No.: PCT/CN2018/092606
§ 371 (c)(1),
(2) Date: Apr. 3, 2020

(87) PCT Pub. No.: WO2019/068243
PCT Pub. Date: Apr. 11, 2019

(65) Prior Publication Data
US 2021/0376922 A1    Dec. 2, 2021

Related U.S. Application Data

(60) Provisional application No. 62/568,738, filed on Oct. 5, 2017.

(51) Int. Cl.
*H04B 10/07*     (2013.01)
*H04B 10/071*    (2013.01)
*G01M 11/00*     (2006.01)

(52) U.S. Cl.
CPC ....... *H04B 10/071* (2013.01); *G01M 11/3127* (2013.01); *G01M 11/3154* (2013.01)

(58) Field of Classification Search
CPC ............ H04B 10/071; G01M 11/3127; G01M 11/3154; G02B 6/3866
See application file for complete search history.

(56) References Cited

U.S. PATENT DOCUMENTS 5,251,001 A    10/1993   Dave et al.
7,090,406 B2    8/2006   Melton et al.
(Continued)

FOREIGN PATENT DOCUMENTS

CN    101226100 A    7/2008
CN    102067483 A    5/2011
(Continued)

OTHER PUBLICATIONS

International Search Report and Written Opinion of the International Searching Authority for International Patent Application No. PCT/CN2018/092606 dated Sep. 29, 2018, 10 pages.
(Continued)

Primary Examiner — Dzung D Tran
(74) Attorney, Agent, or Firm — Merchant & Gould P.C.

(57) ABSTRACT

An optical fiber testing device (300) being plugged into a port at which optical signals including communication and test signals within different wavelength bands being received, comprises an optical connector (304) including a plug body surrounding a ferrule holding an optical fiber (301) and a reflector component (326) carried with the optical connector (304). The reflector component (326) is optically coupled to the rear of the optical fiber and reflects the test signal. A method for testing an optical fiber, comprises removably securing a reusable ruggedized optical fiber testing device to a ruggedized port of an optical fiber (Continued)

terminal to optically couple to an optical fiber under test, transmitting a test signal over the optical fiber under test, and using the reflector component to return the test signal over the optical fiber under test when receiving the test signal.

35 Claims, 13 Drawing Sheets

(56) References Cited

U.S. PATENT DOCUMENTS

| | | | |
|---|---|---|---|
| 7,292,763 B2 | 11/2007 | Mertesdorf et al. | |
| 7,349,605 B2 | 3/2008 | Noonan et al. | |
| 7,489,849 B2 | 2/2009 | Reagan et al. | |
| 7,512,304 B2 | 3/2009 | Gronvall et al. | |
| 7,565,055 B2 | 7/2009 | Lu et al. | |
| 7,572,065 B2 | 8/2009 | Lu et al. | |
| 7,680,388 B2 | 3/2010 | Reagan et al. | |
| 7,720,343 B2 | 5/2010 | Barth et al. | |
| 7,744,288 B2 | 6/2010 | Lu et al. | |
| 7,751,675 B2 | 7/2010 | Holmberg et al. | |
| 8,254,740 B2 | 5/2012 | Smith et al. | |
| 8,213,760 B2 | 7/2012 | Rudenick et al. | |
| 2004/0223720 A1 | 11/2004 | Melton et al. | |
| 2005/0271338 A1* | 12/2005 | Livingston | G02B 6/3831 385/114 |
| 2009/0148101 A1 | 6/2009 | Lu et al. | |
| 2010/0014854 A1* | 1/2010 | Healey | H04B 10/077 398/16 |
| 2013/0044984 A1* | 2/2013 | Kim | G02B 6/0218 385/78 |
| 2016/0098913 A1* | 4/2016 | Vastmans | G08B 21/18 340/600 |
| 2017/0010421 A1* | 1/2017 | Pitwon | G02B 6/3873 |
| 2018/0196191 A1* | 7/2018 | Wang | G02B 6/264 |
| 2018/0372963 A1* | 12/2018 | Bar-Hai | G02B 6/3849 |
| 2019/0011640 A1* | 1/2019 | Cao | G02B 6/264 |
| 2019/0258010 A1* | 8/2019 | Anderson | G02B 6/3849 |

FOREIGN PATENT DOCUMENTS

| | | |
|---|---|---|
| CN | 102156329 A | 8/2011 |
| CN | 102208941 A | 10/2011 |
| CN | 202334525 U | 7/2012 |
| GB | 2261506 A | 5/1993 |
| JP | H10-170396 A | 6/1998 |
| JP | 2005-221388 A | 8/2005 |

OTHER PUBLICATIONS

European Search Report dated Jun. 10, 2021 in Application No. EP 18863968.6; 8 pages.

* cited by examiner

OPTICAL FIBER TESTING DEVICE AND METHOD

This application is a National Stage Patent Application of PCT/CN2018/092606, filed on Jun. 25, 2018, which claims the benefit of U.S. Patent Application Ser. No. 62/568,738, filed on Oct. 5, 2017, the disclosures of which are incorporated herein by reference in their entireties. To the extent appropriate, a claim of priority is made to each of the above disclosed applications.

SUMMARY

An aspect of the present disclosure is directed to an optical fiber testing device that includes an optical fiber supported by a ferrule, a ruggedized optical fiber connector and a reflector component. The ruggedized optical fiber connector is removably, securable to a ruggedized port of an optical fiber terminal. When secured to the port, the ruggedized optical fiber connector enables optical coupling of the optical fiber with an optical adapter within the ruggedized port. When an optical signal transmitted through the optical fiber is received at the reflector component, the reflector component returns the optical signal through the optical fiber.

Another aspect of the present disclosure is directed to a method for testing an optical fiber. The method includes removably securing a reusable ruggedized optical fiber testing device to a ruggedized port of an optical fiber terminal, wherein the securing enables a reflector component within the optical fiber testing device to be optically coupled to an optical fiber under test; transmitting a test signal over the optical fiber under test; and using the reflector component to return the test signal over the optical fiber under test when the transmitted test signal is received at the reflector component.

The above summary is not intended to describe each embodiment or every implementation. A more complete understanding will become apparent and appreciated by referring to the following detailed description and claims in conjunction with the accompanying drawings.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
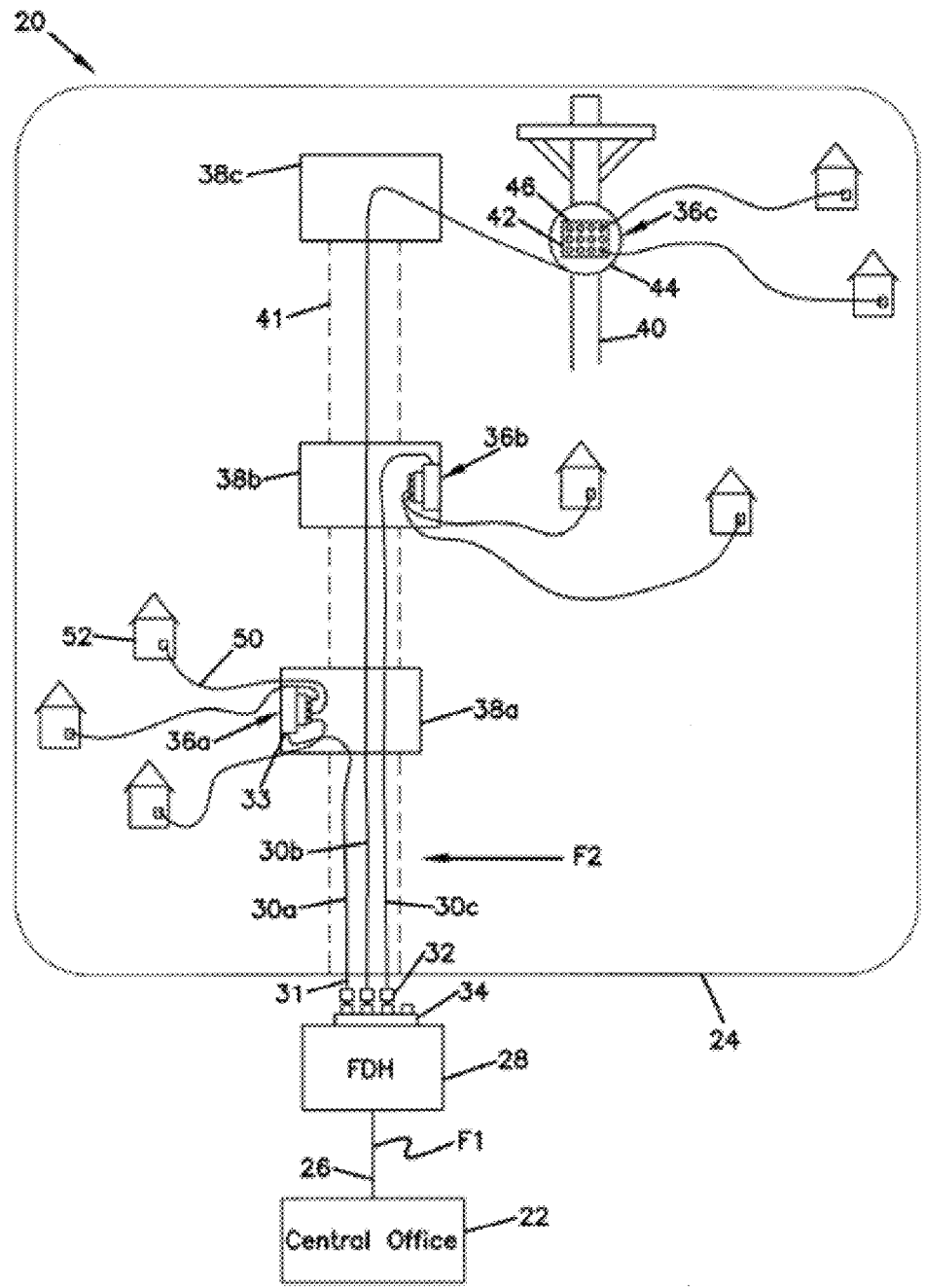
FIG. 1 illustrates an example of a fiber optic network.

Various embodiments will be described in detail with reference to the drawings, wherein like reference numerals represent like parts and assemblies through the several views. Reference to various embodiments does not limit the scope of the claims attached hereto. Additionally, any examples set forth in this specification are not intended to be limiting and merely set forth the many possible embodiments for the appended claims.

Whenever appropriate, terms used in the singular also will include the plural and vice versa. The use of "a" herein means "one or more" unless stated otherwise or where the use of "one or more" is clearly inappropriate. The use of "or" means "and/or" unless stated otherwise. The use of "comprise," "comprises," "comprising," "include," "includes," and "including" are interchangeable and not intended to be limiting. The term "such as" also is not intended to be limiting. For example, the term "including" shall mean "including, but not limited to."

A ruggedized optical fiber testing device of the present disclosure comprises a portable, reusable, remounted ruggedized device for testing the operational status of an optical fiber. The optical fiber testing device includes an optical fiber connector that is configured to interface with a first end of an optical fiber adapter within a ruggedized port of an optical fiber terminal. Interfacing with the adapter enables the optical fiber testing device to be optically coupled to an optical fiber that is interfaced and optically coupled to the second end of the adapter. The optical fiber testing device includes a reflector component (e.g., device or coating) that can return through the optical fiber a test signal that was originally sent down the optical fiber. The ruggedized and reusable nature of the optical fiber testing device enables it to be left at terminals in exposed environments and/or enables it to be moved from one port to another or one terminal to another.

FIG. 1 shows an example of a passive fiber optic distribution network 20. Generally, a distribution network 20 is adapted for transmitting fiber optic telecommunication services between a central office 22 and a local area 24 (e.g., a local loop). The distribution network includes an F1 distribution cable 26 that preferably includes a plurality of optical fibers. For example, in one embodiment, the F1 distribution cable 26 may have on the order of 12 to 48 fibers. However, alternative numbers of fibers may also be used. One or more of the optical fibers of the F1 distribution cable 26 are routed to a fiber distribution hub 28. The fiber distribution hub 28 preferably includes one or more passive optical splitters adapted to split signals carried by the fibers of the F1 distribution cable 26 into a plurality of fibers that are optically coupled to one or more F2 distribution cables 30a-c routed from the distribution hub 28 into the local area 24. In one embodiment, the F2 distribution cables 30a-c can each include 12 optical fibers. As shown at FIG. 1, the F2 distribution cables 30a-c include first ends 31 terminated by ruggedized multi-fiber connectors 32. The multi-fiber connectors 32 interface with a bank 34 of fiber optic adapters provided at an exterior of the fiber distribution hub 28. The adapter bank 34 facilitates quickly providing an optical connection between the optical fibers within the fiber distribution hub 28 and the optical fibers of the F2 distribution cables 30a-c. Fiber optic drop terminals 36a-c are respectively located at second ends 33 of the F2 distribution cables 30a-c. Drop terminal 36a is shown positioned within hand hole 38a, drop terminal 36b is shown mounted within hand hole 38b, and drop terminal 36c is shown mounted to a utility pole 40. The F2 distribution cables 30a-c are shown routed through an underground conduit 41 that is shown interconnecting three hand holes 38a-38c. Referring still to FIG. 1, fiber optic drop cables 50 are routed from the drop terminals 36a-c to ONT's located at subscriber locations 52.

Each of the drop terminals 36a-c includes a housing 42 and, optionally, a spool 44 connected to the housing 42. A plurality of ruggedized fiber optic adapters 46 are mounted to each of the housings 42. It will be understood that the term "ruggedized" refers to a component or system that is capable of withstanding the elements of an outdoor environment and that reduces the risk of or prevents the ingress of dirt, dust, water, etc. from entering the drop terminal 36. The ruggedized fiber optic adapters 46 include first ports that are accessible from outside the housings 42 and second ports that are accessible from inside the housings 42. The fibers of the F2 distribution cables 30a-c are terminated by optical connectors that are inserted into the second ports of the ruggedized fiber optic adapters 46. In certain embodiments, the optical connectors can be terminated directly on the ends of the fibers of the F2 distribution cables 30a-c. In alternative embodiments, the optical connectors can be terminated indirectly to the ends of the optical fibers of the F2 distribution cables 30 through the use of connectorized pigtails that are spliced to the ends of the fibers of the F2 distribution cables 30a-c.

The drop cables 50 can be terminated at each end by a ruggedized optical connector. An example ruggedized optical connector is disclosed at U.S. Pat. No. 7,090,406 that is hereby incorporated by reference in its entirety. The ruggedized optical connector terminated at one end of a given drop cable can be inserted into the first port of one of the drop terminals 36a-c, while the ruggedized optical connector located at the opposite end of the drop cable can be inserted into a corresponding ruggedized adapter provided at the ONT located at the subscriber location 52. In the subject embodiment, the ruggedized optical connector includes a sealing member that engages a sealing surface of the ruggedized fiber optic adapter to provide an environmental seal or a weatherproof seal between the ruggedized optical connector and the ruggedized adapter 46.

Portions of the F2 distribution cables 30a-c are preferably wrapped around the spools 44 of the drop terminals 36a-c. For example, the F2 distribution cables 30a-c may include first lengths that extend from the drop terminals 36a-c to the fiber distribution hub 28, and second lengths that are wrapped around the spool 44 corresponding to the given drop terminal 36a-c. Thus, the total length of each of the F2 distribution cables 30a-c includes the length of cable extending from the drop terminal to the fiber distribution hub 28 plus an excess length that remains wrapped around the spool 44 after installation of the drop terminal 36a-c. From the spool 44, the fibers of the multi-fiber cables 30 are routed into the interior of the housing 42 through an access opening. An environmental seal preferably is provided at the access opening. In certain embodiments, the access opening is provided at a backside of the housing while the ruggedized fiber optic adapters are provided at a front side of the housing. Additional details regarding the fiber optic networks with which the systems, methods, and/or devices of the present disclosure can be used can be found in U.S. Pat. Nos. 8,254,740 and 7,720,343, each of which is hereby incorporated by reference in its entirety.

Figure 2:
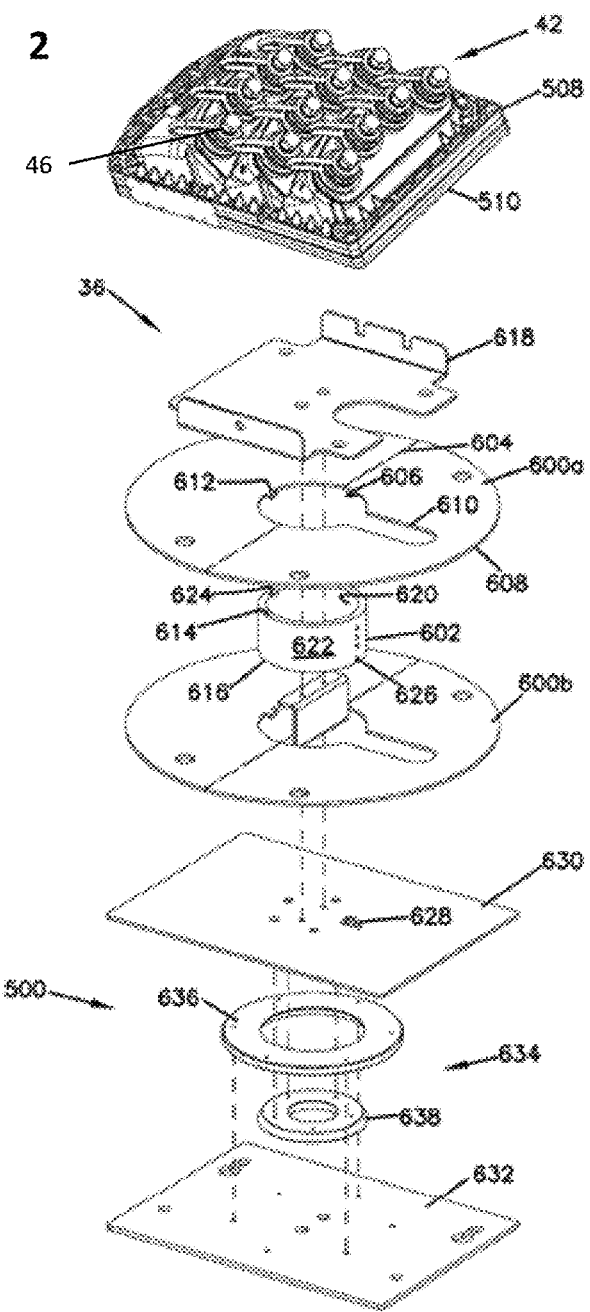
FIG. 2 is an exploded perspective view of an example of a drop terminal assembly suitable for use in the fiber optic network of FIG. 1.

Referring to FIG. 2, an exemplary configuration of the drop terminal 36 is shown. The drop terminal 36 includes the housing 42, the spool disposed on an exterior surface of the housing 42 and a mounting assembly 500 adapter for rotational engagement with the spool 44. Additional details regarding the mounting assembly 500 are, once again, found in U.S. Pat. No. 8,254,740.

Figure 3:
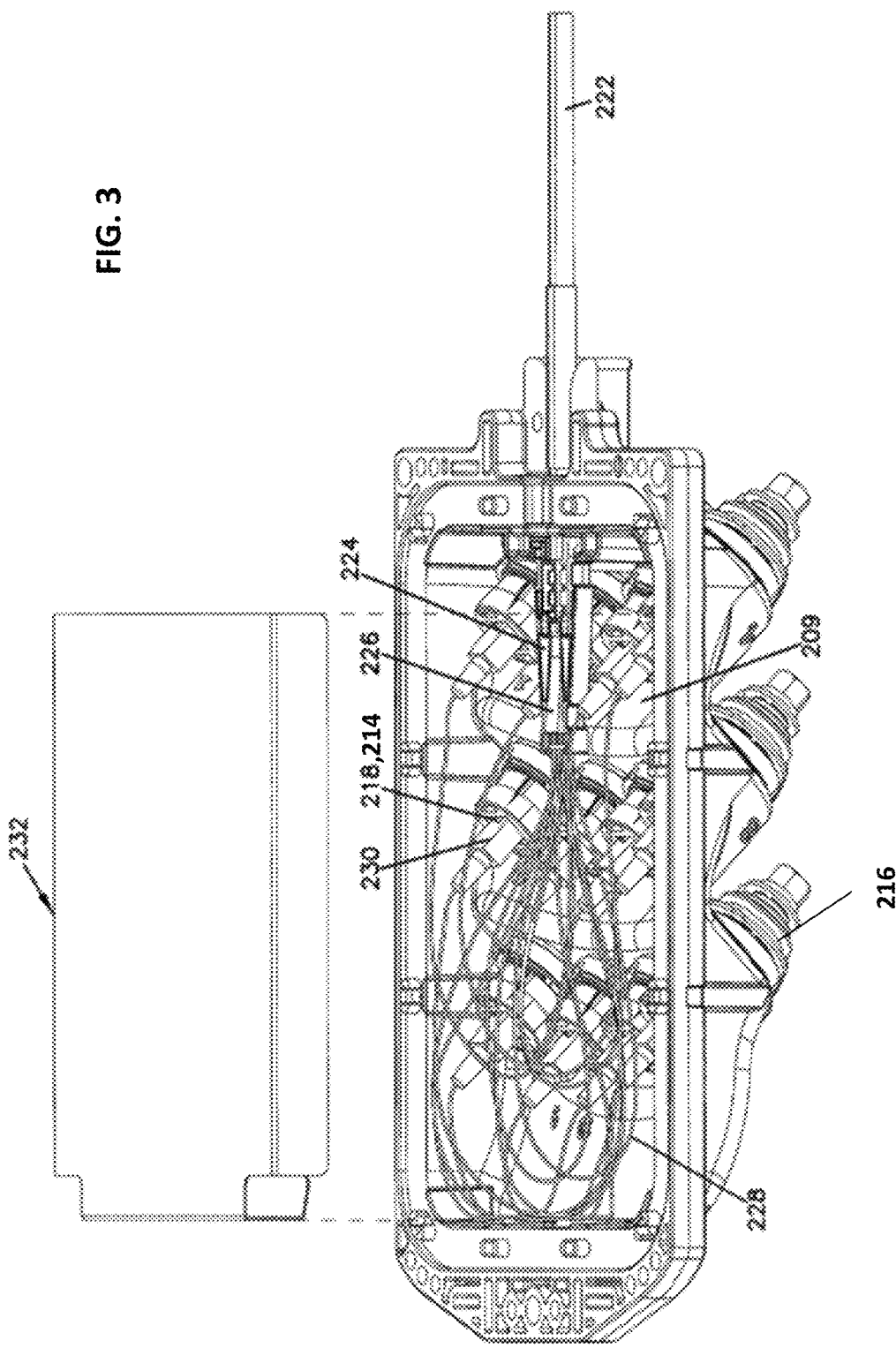
FIG. 3 is a rear perspective view of an example of a drop terminal.
Figure 4:
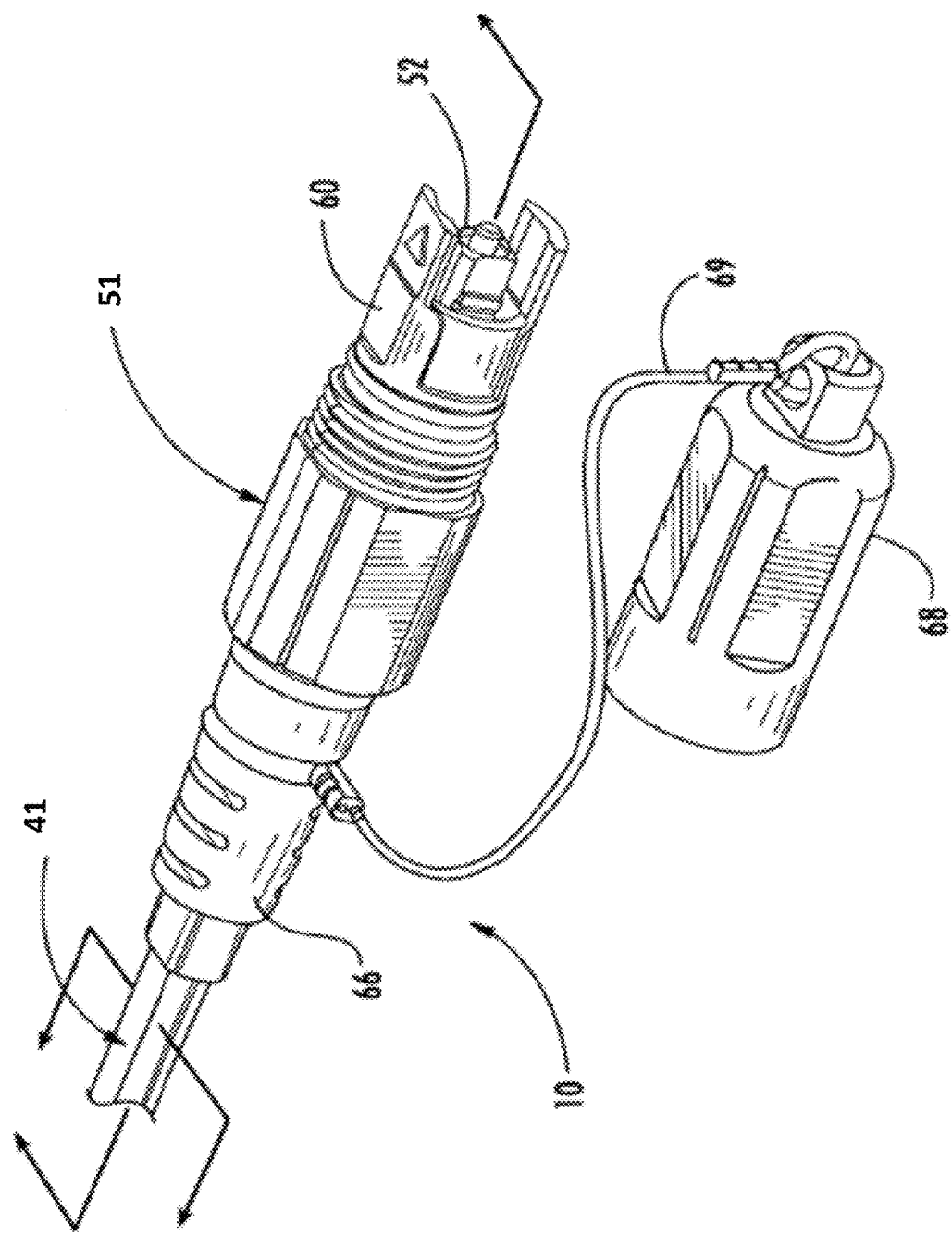
FIG. 4 is a perspective view of an example of a ruggedized, connectorized drop cable configured to interface with the drop terminals illustrated in FIGS. 1-3.
Figure 5:
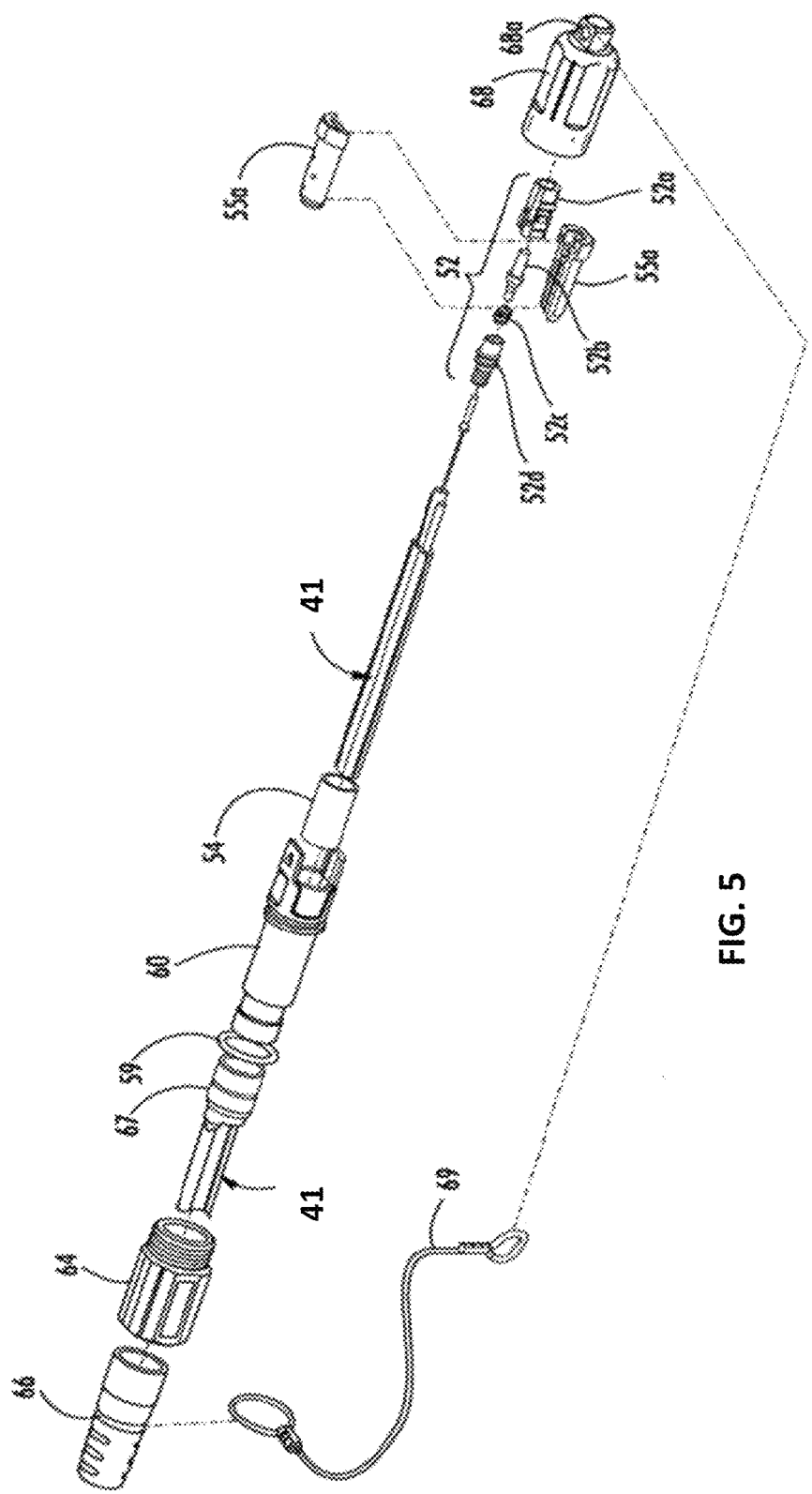
FIG. 5 is an exploded view of the ruggedized, connectorized drop cable of FIG. 4

A rear perspective view of a drop terminal 200 with its rear seal plate (not shown) and rear internal cover 232 removed is illustrated in FIG. 3. As shown the drop terminal includes an enclosable interior 209, a plurality of fiber optic adapters 214 mounted within (each fiber optic adapter having an inner port 218 and an outer port 216), an anchor block for securing a fiber optic cable 222 to the drop terminal 200, and a fan-out portion 226 that spreads apart the optical fibers 228 of the fiber optic cable 222. An inner fiber optic connector 230 is mounted at the end of each optical fiber 228. The ruggedized outer port of the fiber optic adapter 214 is configured to interface with a ruggedized connector, an example of which is illustrated in FIGS. 4 and 5 and described below. Further details regarding drop terminals and other types of terminals with which embodiments of the systems, methods and/or device of the present disclosure can be used can be found in U.S. Pat. Nos. 7,512,304, 7,292,763, 7,489,849, 7,751,675, and 8,213,760, each of which is hereby incorporated by reference in its entirety.

Referring to FIGS. 4-5, an exemplary configuration of a ruggedized, preconnectorized drop cable 50 is shown with FIG. 4 illustrating the drop cable 50 in an assembled form and FIG. 5 illustrating an unassembled form. The drop cable 50 is configured to interface with the ruggedized fiber optic adapters 46 of the drop terminal 36. Referring to FIG. 3, the drop cable 50 generally comprises a fiber optic cable 40 and a connector 51. The connector 51 includes a connector assembly 52, a shroud 60, and a cable boot 66. In certain embodiments, a protective cap 68 is secured to the connector 51 by a wire assembly 69. In the illustrated embodiment, the cable 41 is a flat dielectric cable and connector 51 uses a connector assembly 52 of the SC type, but other types of connector assemblies such as LC, FC, ST, MT, etc. can also be used. FIG. 5 further illustrates the connector assembly 52 having a connector body 52a, a ferrule 52b in a ferrule holder (not numbered), a spring 52c, and a spring push 52d. The connector 51 additionally includes a crimp assembly having a crimp housing that includes a shell (having first and second halves) 55a and a crimp band 54, shroud 60 having an O-ring 59, a coupling nut 64, a cable boot 66, a heat shrink tube 67. Further details regarding ruggedized connectors for optical fibers which can be utilized by embodiments of the systems, methods and/or device of the present disclosure can be found in U.S. Pat. Nos. 7,090,406, 7,744, 288, and 7,572,065, each of which is hereby incorporated by reference in its entirety. One ruggedized connector system is the DLX Fiber Optic Connector System from Commscope.

In certain situations, it may be necessary or desirable to determine the operational status of an optical fiber at a drop terminal. In order to test the operational status of an optical fiber connected to the inner port 218 of a ruggedized adapter 214, a ruggedized, optical fiber test device according any of the various embodiments of the present disclosure can be removably, optically coupled to the outer port 216 of the ruggedized adapter 214. The ruggedized optical fiber test device can be left in an optically coupled positioned for extended periods of time due to its ruggedized nature or can be removed and reused on a different outer port at the same or different terminal.

Figure 6:
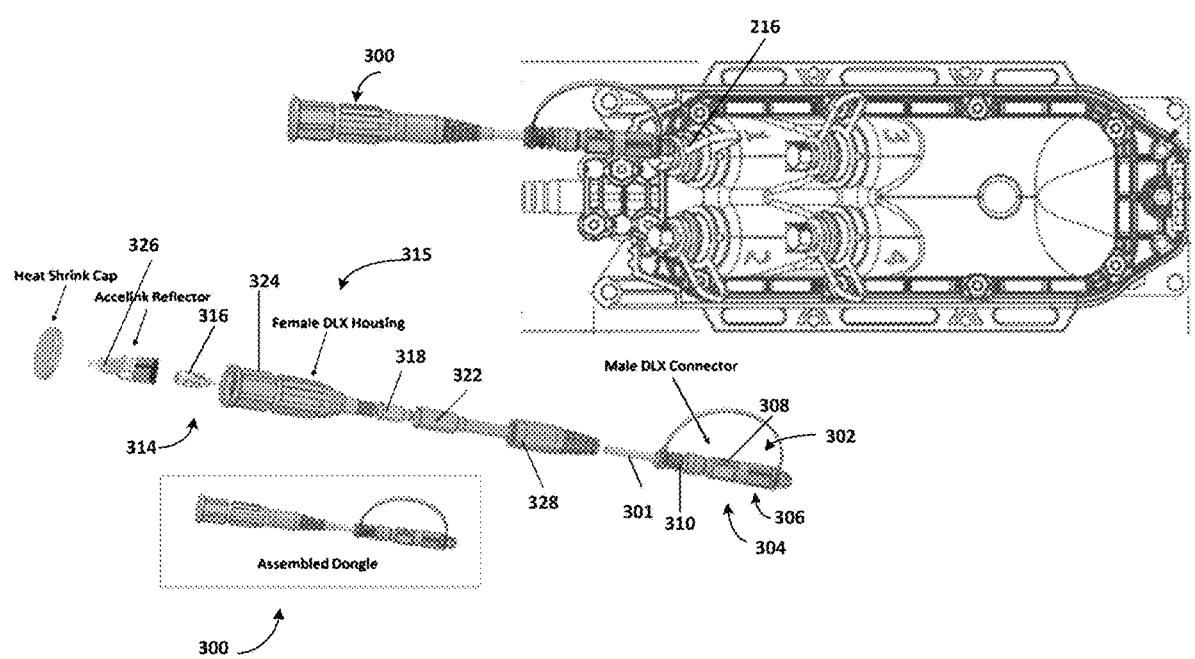
FIG. 6 is an assembled and exploded view of an example embodiment of an optical fiber testing device according to the present disclosure.

An example embodiment of an optical fiber test device 300 is shown in FIG. 6. In this example, the device 300 is in the form of a ruggedized dongle. The device 300 includes a length of fiber optic cable 301. A first end 302 of the fiber optic cable 301 includes a ruggedized connector 304 similar to the connector 51 described above. The ruggedized connector 304 includes a connector assembly 306, a shroud 308, and a cable boot 310. A protective cap 312 is secured to the ruggedized connector 304. In this example, the connector assembly 306 includes a DLX connector with an SC format that is configured to interface with a DLX adapter at an outer port 216 (see FIG. 3) of a drop terminal. Other types of connectors, e.g., LC, FC, ST, MT, etc., may also be utilized. DLX connectors are further described in U.S. Pat. Nos. 7,744,288 and 7,572,065, each of which is hereby incorporated by reference in its entirety.

A second end 314 of the fiber optic cable 301 is also equipped with a DLX connector 315 (or other type of connector). The connector body 316 and the crimp assembly 318 of the DLX connector 315 are shown. A heat shrink tube 322 helps to seal and secure the crimp assembly to the fiber optic cable 301. The DLX connector 315 resides in a reflector housing 324 that is sized to accommodate a reflector component 326 configured to return/reflect an optical signal. In this example, the reflector component 326 comprises an ACCELINK reflector, however other commercially available reflectors can be used. The DLX connector 315 is configured to interface with the reflector component 326. A threaded boot 328 is secured to the reflector housing 324. The reflector housing 324 is sealed for ruggedized use. In this example, a heat shrink cap 326 seals the reflector housing 324, however, other types of sealants and/or manners of sealing can also be used. The DLX connector 315 performs a housing function of the fiber 301, the connector body 316, and the reflector component 326.

In operation, the device 300 can be interfaced to a ruggedized outer port 216 of an adapter 214 (see FIG. 3 also) through a twist-to-lock fastener (e.g. threaded fastener or bayonet fastener). A test signal can then transmitted through the optical fiber, e.g. optical fiber 228, and adapter 214 to the optical fiber test device 300. If the device 300 returns the signal, the optical fiber 228 is deemed operational; failure to return the optical signal indicates a non-operational (e.g., broken or damaged optical fiber). An OTDR (optical time-domain reflectometer) can be used to send the test signals and determine if the reflection is the expected reflection or an unexpected reflection indicating there may be damage to the optical fiber. The described test signals can be utilized with any of the embodiments of the optical fiber test devices described herein.

Figure 7:
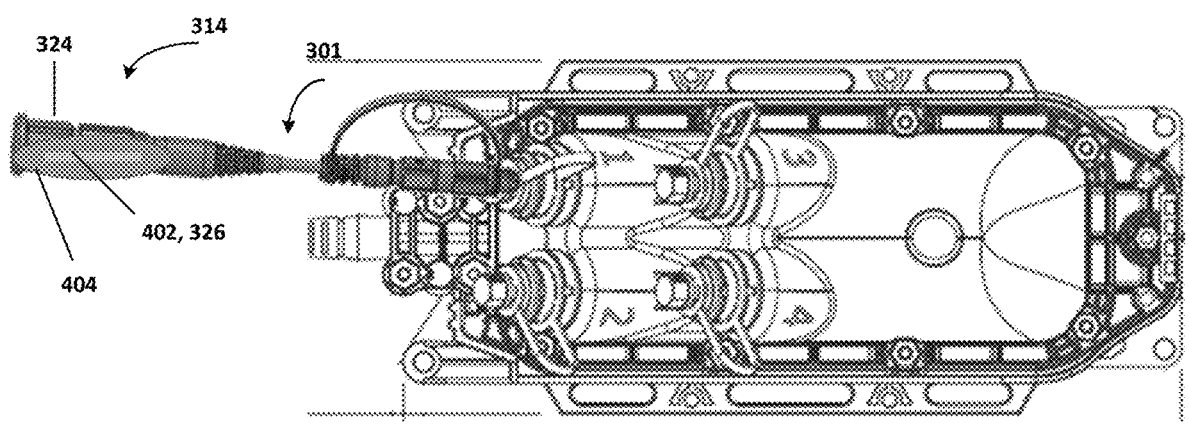
FIG. 7 is an example embodiment of an optical fiber testing device according to the present disclosure.

An example of an optical fiber test device 400 is shown in FIG. 7. In this example, the device 400 is once again in the form of a ruggedized dongle, similar to FIG. 6. However, in this example, the second end 314 of the optical fiber cable 301 is not connectorized. Rather a bare end of the optical fiber 301 is spliced to a portion of optical fiber 402 having a Bragg grating; the Bragg grating operates as the reflector component 326. In certain examples, the portion of optical fiber 402 can alternatively include a reflective fiber coating to function as the reflector component 326, or include a thin film filter as the reflector component. The portion of optical fiber 402 can be protected with an epoxy 404 or other appropriate protective material. The epoxy 404 can be used to seal the reflector housing 324 alone or in addition to other sealing materials or manners of sealing.

Figure 8:
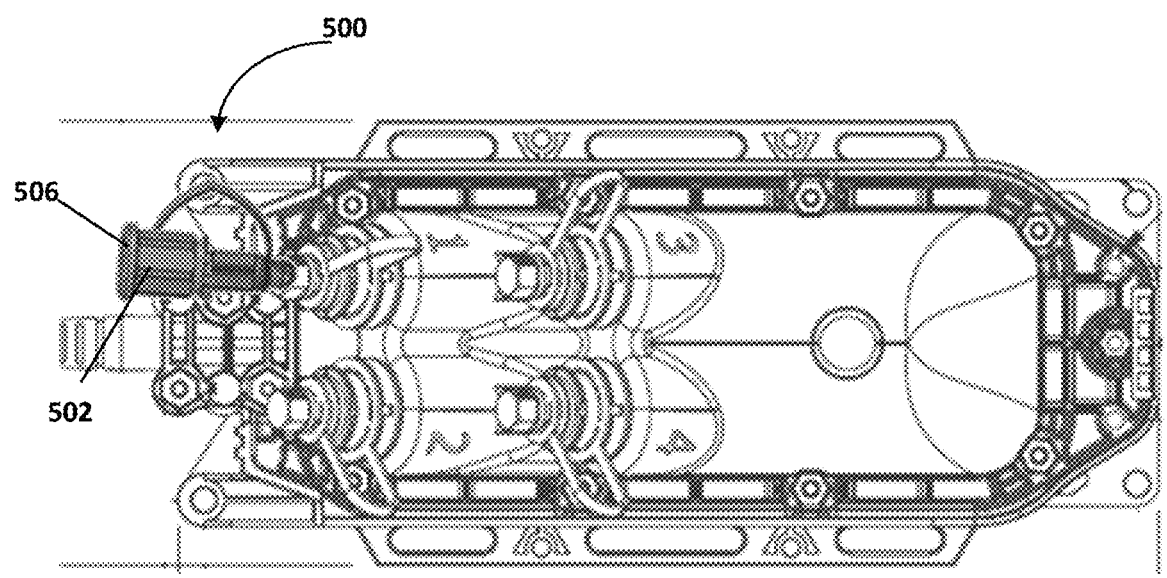
FIG. 8 is an example embodiment of an optical fiber testing device according to the present disclosure.

An example of an optical fiber test device 500 is shown in FIG. 8. In this example, the device 500 is in the form of a ruggedized connector assembly. The device 500 comprises a connector similar to the connector 304 or connector 51 described above. The connector 500 is coupled to a portion of optical fiber that includes a reflective component, such as the Bragg grating, reflective coating or thin film filter. In certain example, the portion of optical fiber is coupled to a reflective component such as the ACCELINK reflector. However, the shroud 502 of the connector of the device 500 serves, along with a sealed end cap 506, to completely enclose the reflective component, e.g. an additional reflector housing is not necessary. As with the other example embodiments, the device 500 is reusable and remountable.

Another example of an optical fiber test device 600 is shown in FIGS. 9-12. In this example, the test device 600 is in the form of a ruggedized connector assembly presenting a connector end similar to connector 51 or 304. The test device 600 is configured to be plugged into a port and to reflect an optical signal received from the port back to the port. In certain implementations, the test device 600 is configured to reflect back any optical signal within a predetermined wavelength range.

The test device 600 includes an optical fiber 602 (FIG. 11) extending from an end face 602a of a ferrule 604 towards a rear 602b of the ferrule 604. The ferrule 604 includes an optically reflective coating 630 at the rear 602b of the ferrule 604. Optical signals carried over the optical fiber 602 towards the rear 602b of the ferrule 604 encounter the coating 630. Optical signals having wavelengths within a predetermined range are reflected by the coating 630 back along the optical fiber 602 towards the end face 602a of the ferrule 604. In certain examples, optical signals outside the predetermined wavelength range are not reflected back by the coating 630.

The test device 600 includes a body assembly configured to facilitate handling of the ferrule 604. In certain implementations, the body assembly also facilitates interfacing the optical ferrule 604 with the port at which the test device 600 is received. In certain implementations, the body assembly also creates an environmentally seal between the test device 600 and the port when the test device 600 is received at the port.

Figure 9:
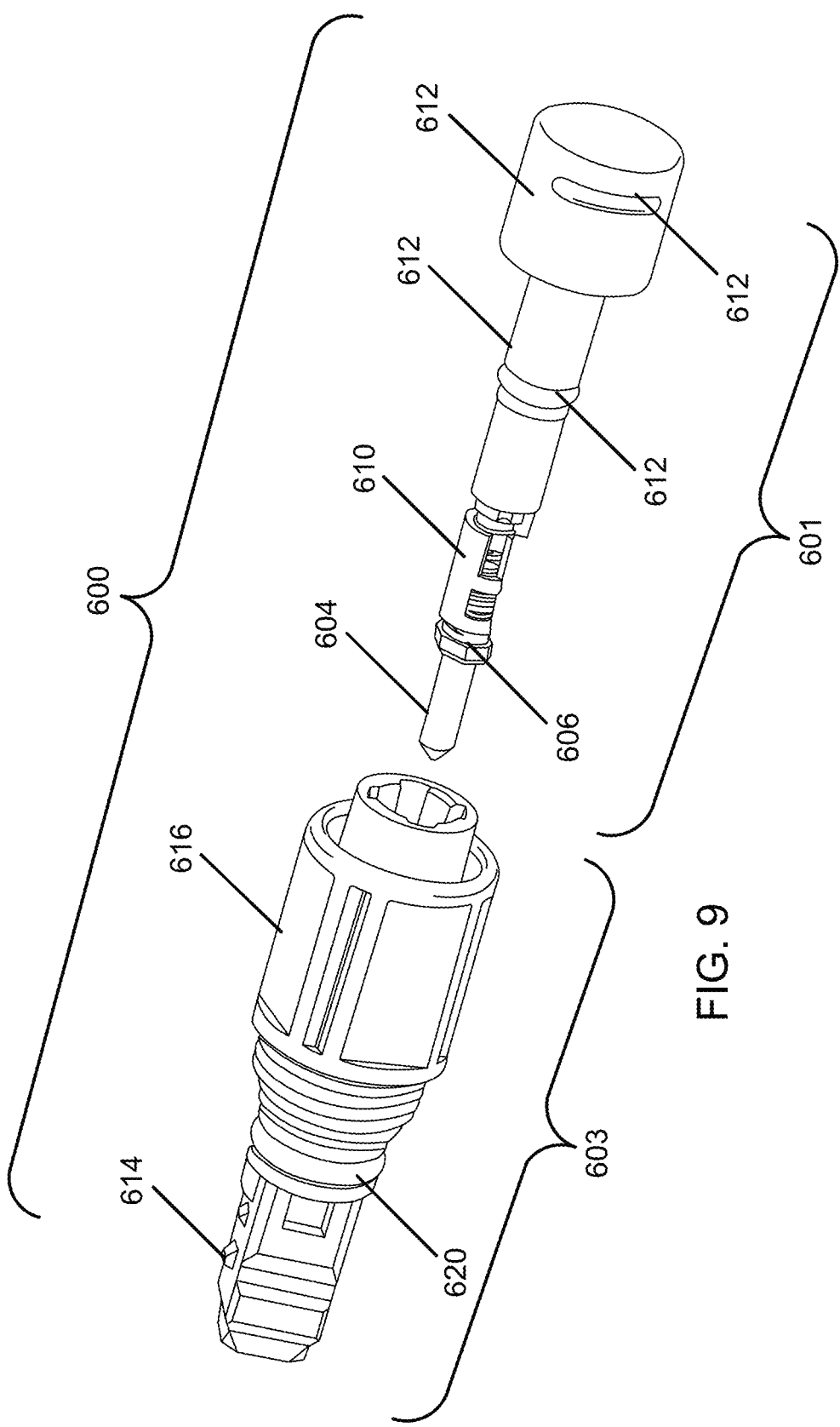
FIG. 9 is an exploded view of an example optical fiber testing device configured in accordance with the principles of the present disclosure.
Figure 10:
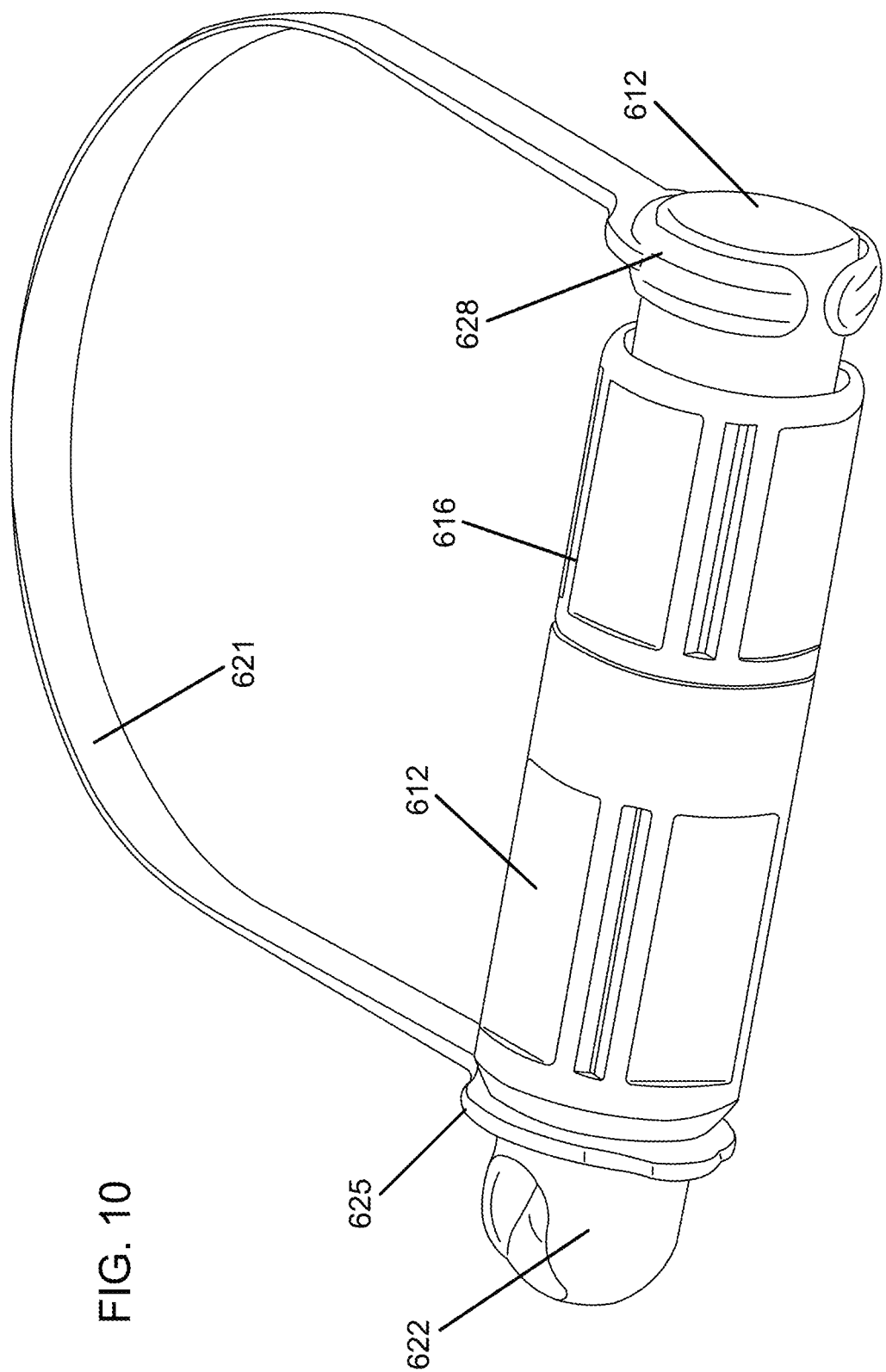
FIG. 10 is a side perspective of the example of the optical fiber testing device in FIG. 9.
Figure 11:
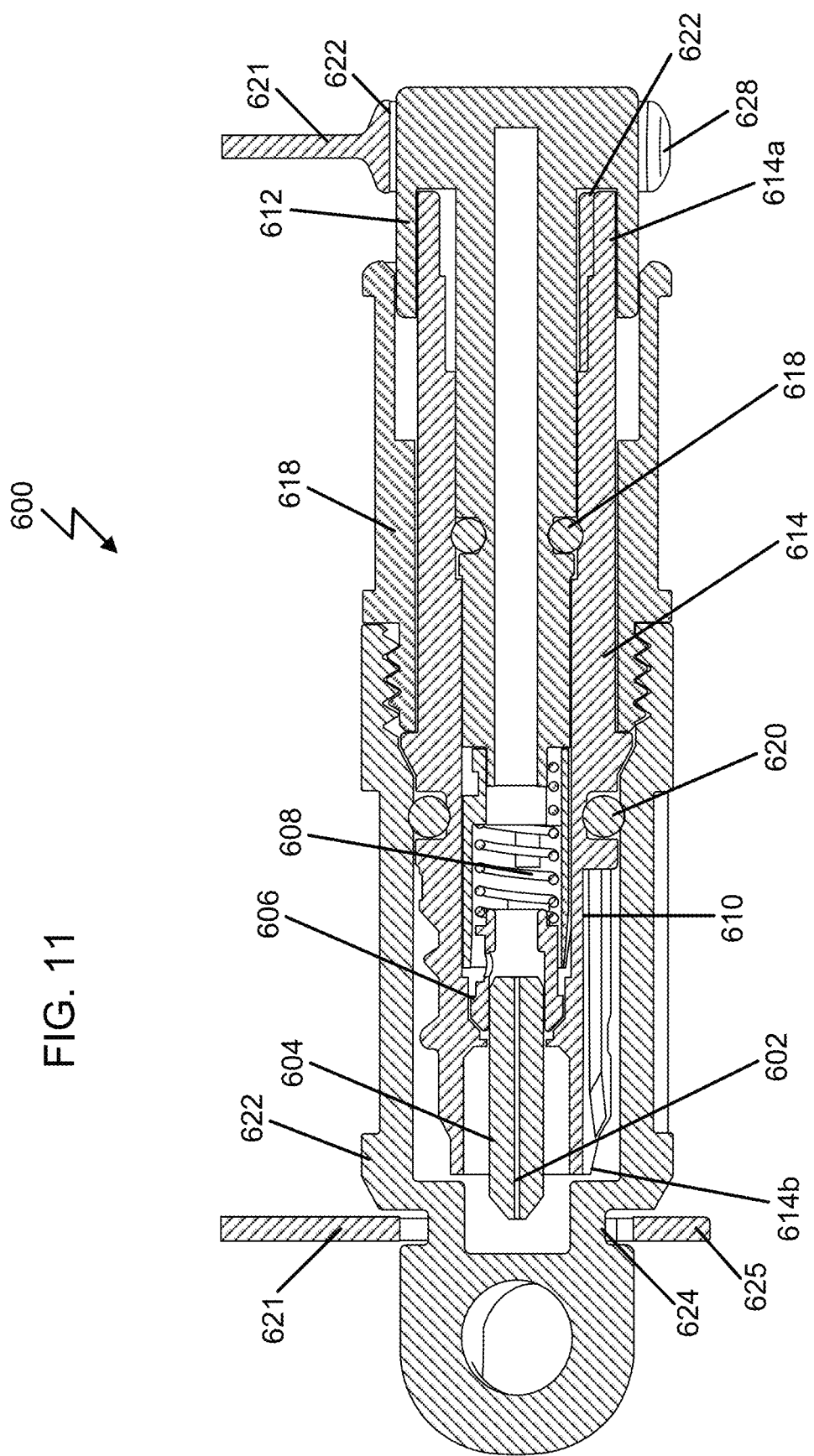
FIG. 11 is a side-sectional view of an example of an optical fiber testing device as illustrated in FIG. 9.

As shown in FIG. 9, the test device 600 includes a ferrule assembly 601 and a plug assembly 603. The plug assembly 603 is configured to mate with the port. For example, the plug assembly 603 includes a plug body 614 configured to mate with an adapter port and a twist-to-lock fastener (e.g., threaded, bayonet, etc.) 616 configured to axially secure the test device 600 at the port. In various examples, the plug body 614 is an SC connector body, an LC connector body, an LX.5 connector body, a DLX connector body, an MPO connector body, etc. In certain examples, the plug assembly 603 is configured to seal against the port. For example, the plug assembly 603 may include an external seal (e.g., an O-ring) 620 carried by the plug body 614 or by the fastener 616.

The ferrule assembly 601 includes the ferrule 604, a ferrule hub 606 holding the rear of the ferrule 604, and a spring push 610 disposed at the rear of the hub 606. A spring 608 is disposed between the ferrule hub 606 and the spring push 610 to bias the ferrule 604 forwardly away from the spring push 610. An end cap 612 is disposed rearwardly of the spring push 610. The ferrule hub 606 and spring push 610 are open, thereby forming a passage to the rear of the ferrule 604. The end cap 612 closes the passage. In certain implementations of the test device 600, no optical fiber extends through the passage rearwardly of the ferrule 604.

In certain implementations, the ferrule assembly 601 is configured to seal to the plug assembly 603. For example, an internal seal 618 may be disposed between the ferrule assembly 601 and the plug assembly 603. In some examples, the internal seal 618 is carried by the ferrule assembly 601. In the example shown, the internal seal 618 is carried by the end cap 612. In other examples, however, the internal seal 618 may be carried by the plug assembly 603.

In certain implementations, an outer cap 622 may selectively cover the end face of the test device 600. In certain examples, the outer cap 622 is mounted to the plug assembly 603. For example, the outer cap 622 may have a twist-to-lock mechanism that interfaces with the twist-to-lock fastener 616. In the example shown, the outer cap 622 threads onto the fastener 616. In certain implementations, the outer cap 622 may be tethered to the test device 600 via tether 621. In certain examples, the tether 621 connects the outer cap 622 to the ferrule assembly 601. In the example shown, the tether 621 connects the outer cap 622 to the end cap 612.

In certain implementations, the test device 600 is elongated along a longitudinal axis. In certain examples, the test device 600 is not flexible along the longitudinal axis. In certain examples, the test device 600 is rigid along the longitudinal axis in comparison to the other test devices described above.

Figure 12:
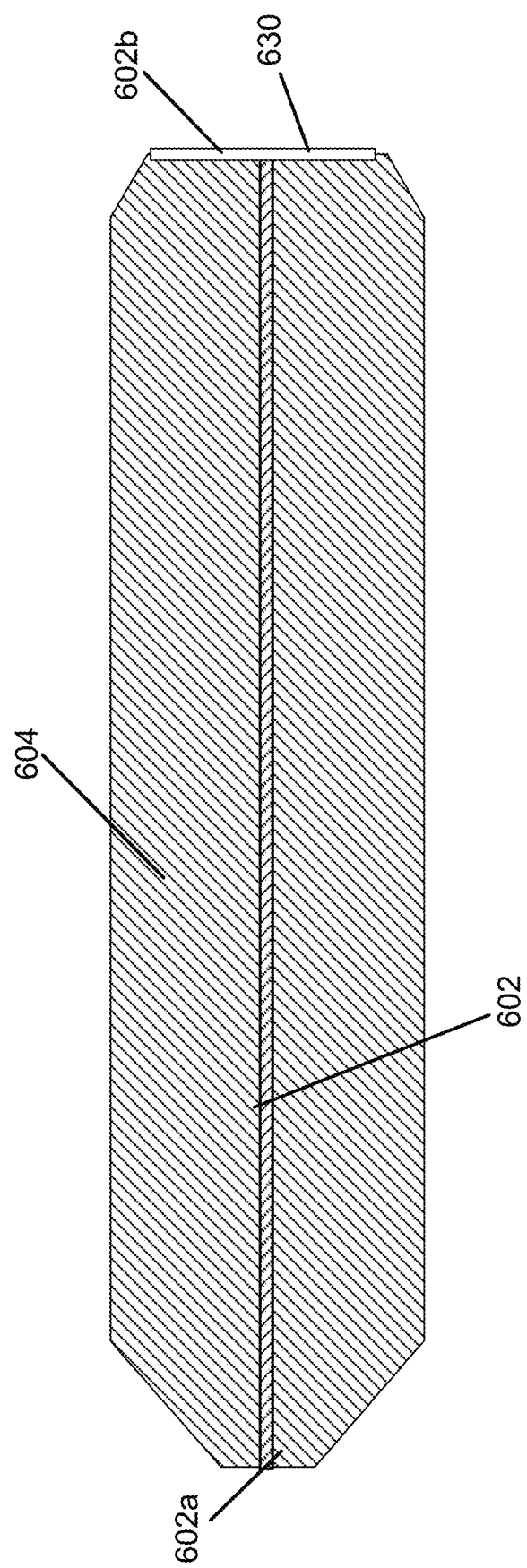
FIG. 12 is a side-sectional view of a fiber and ferrule of the optical fiber testing device of FIG. 9.

In certain examples, referring to FIG. 12, the optical fiber 602 is prepared by inserting the optical fiber 602 within the ferrule 604 and polishing an end face 602a of the optical fiber 602. An opposite end 602b of the optical fiber 602 receives the coating 630.

In certain examples, the coating 630 is a reflective thin film coating. In certain implementations, multiple layers of the coating 630 can be applied to the rear end 602b of the fiber 602. In certain implementations, the thickness of the layers of the coating 630 can vary in size. In certain implementations, the composition of the layers of the coating 630 can vary layer-to-layer so that one layer can have a different index of reflection than another layer. In certain implementations, the number of layers, the composition of each layer, and/or the thickness of each layer is selected to customize the wavelength range reflected by the coating 630.

In certain implementations, the coating 630 can be applied to multiple fibers 602 simultaneously. For example, a plurality of optical ferrules 604 can be disposed on a base in a vacuum chamber. Each optical ferrule 604 is masked or otherwise held within the base so that only the rear surfaces of the ferrules 604 are exposed. The rear ends 602b of the optical fibers 602 are exposed at the rear surfaces of the ferrules 604. The coating 630 is then applied, layer-by-layer, within the vacuum chamber. For manufacturing ease, the coating 630 is applied to the rear surface of each ferrule 604. However, in other examples, the coating 630 may be applied to the rear end of the optical fiber 602 only.

As with the other example embodiments, the device 600 is reusable and remountable. Further, the ruggedized nature of the device 600 allows it be left in place without concern of external elements affecting operation of the device 600.

Figure 13:
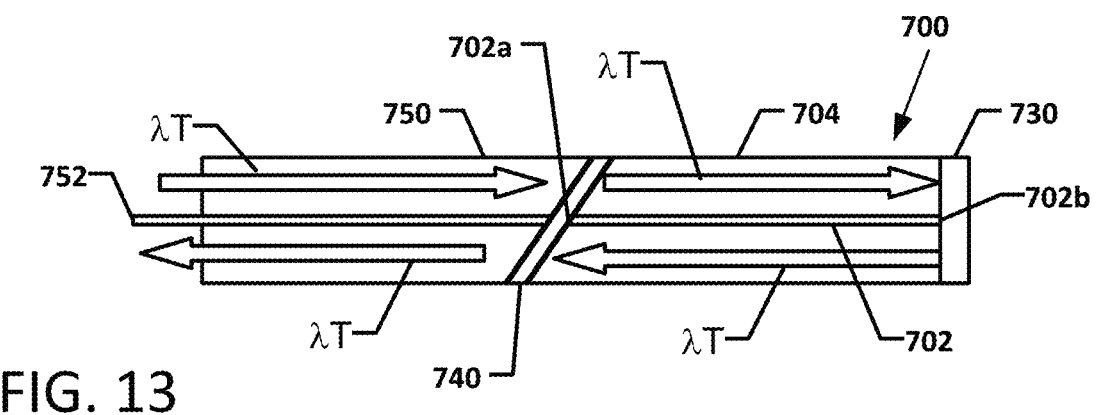
FIG. 13 is a schematic view showing a test signal propagating along an example optical testing device including a filtration film at a front of an optical fiber and a reflector component at a rear of the optical fiber.
Figure 14:
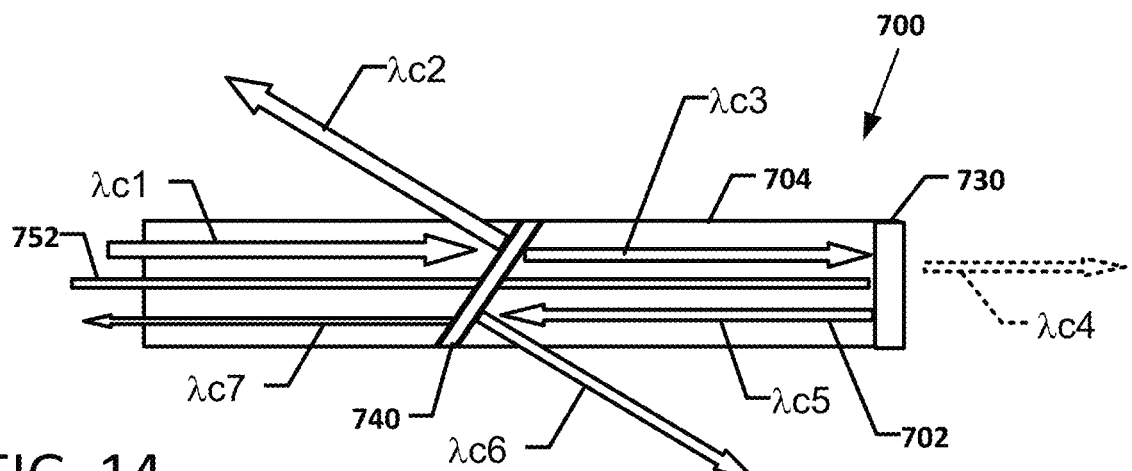
FIG. 14 shows a communications signal propagating along the optical testing device of FIG. 13.

Referring to FIGS. 13 and 14, a filtration film 740 can be added to a front end of the ferrule of any of the optical testing devices disclosed herein to increase the return loss of the communications signals. In certain implementations, the filtration film 740 is applied to an angled surface (e.g., inclined plane, inclined sphere, etc.). Depending on the effectiveness of the filtration film 740, the reflector component of the testing device may be configured to reflect either only the test signal band or both the test signal band and the communications signal band.

As an example, FIGS. 13 and 14 illustrate an example testing device 700 including an optical ferrule 704 holding an optical fiber 702. A rear 702b of the fiber 702 is optically coupled to a reflector component 730. In some examples, the reflector component 730 is an optically reflective film applied to the rear 702b of the fiber 702. In other examples, the reflector component 730 is a Bragg grating reflector (e.g., spliced to the rear 702b of the fiber 702). A filtration film 740 is applied to a front 702a of the fiber 702.

In certain implementations, the filtration film 740 and the reflective film 730 each is formed by physical vapour deposition (PVD), for example Electron beam evaporation and sputtering. In certain implementations, the filtration film 740 and the reflective film 730 each is formed of multiple layers of material (e.g., deposited material). In certain implementations, the thickness of the layers can vary in size. In certain implementations, the composition of the layers can vary layer-to-layer so that one layer can have a different index of reflection than another layer. In certain implementations, the number of layers, the composition of each layer, and/or the thickness of each layer is selected to customize the wavelength range reflected by the reflective film 730 and/or filtration film 740. In an example, the reflective and filtration films 730, 740 include a Ta2O5 or TiO2 layer and a SiO2 layer.

The testing device 700 is optically coupled to another ferrule 750 holding an optical fiber 752 that carries optical signals. The optical signals carried over the fiber 752 include communications signals and test signals. The communication signals have a different wavelength or wavelength band than the test signals.

The filtration film 740 is transmissive to the test signal wavelength band, but reflective to the communications signal wavelength band. For example, in FIG. 13, a test signal $\lambda T$ is sent down the fiber 752 to the test device fiber 702. The test signal $\lambda T$ passes through the filtration film 740 with little to no reflection. The reflector 730 reflects at least a majority of the test signal $\lambda T$ back towards the front of the ferrule. The reflected test signal $\lambda T$ encounters the filtration film 740 again and passes through with little to no reflection. Accordingly, the test signal $\lambda T$ propagates back down the fiber 752 to a test signal receiver.

As shown in FIG. 14, a communications signal $\lambda C1$ is sent down the fiber 752 to the test device fiber 702. It will be understood that the communications signal $\lambda C1$ can be sent concurrently with the test signal $\lambda T$ since the communications signal has a different wavelength. The filtration film 740 reflects a portion $\lambda C2$ of the communications signal $\lambda C1$. The reflected portion $\lambda C2$ is directed to the cladding of the fiber 702 or otherwise directed away from the transmissible portion of the fiber 702. Accordingly, the reflected portion $\lambda C2$ does not propagate back down the fiber 702 to the test signal receiver.

In certain implementations, the filtration film 740 reflects at least a majority of the communications signal $\lambda C1$. In certain examples, the filtration film 740 reflects at least 95% of the communications signal λC1. In certain examples, the filtration film 740 reflects at least 98% of the communications signal λC1. In certain examples, the filtration film 740 reflects at least 99% of the communications signal λC1. In certain examples, the filtration film 740 reflects at least 99.5% of the communications signal λC1. In certain examples, the filtration film 740 reflects at least 99.7% of the communications signal λC1. In certain examples, the filtration film 740 reflects at least 99.8% of the communications signal λC1. In certain examples, the filtration film 740 reflects at least 99.9% of the communications signal λC1.

Accordingly, the remainder λC3 of the communications signal λC1 is no more than 5% of the original communications signal λC1. In certain implementations, the remainder λC3 of the communications signal λC1 is no more than 2% of the original communications signal λC1. In certain implementations, the remainder λC3 of the communications signal λC1 is no more than 1% of the original communications signal λC1. In certain implementations, the remainder λC3 of the communications signal λC1 is no more than 0.5% of the original communications signal λC1. In certain implementations, the remainder λC3 of the communications signal λC1 is no more than 0.3% of the original communications signal λC1. In certain implementations, the remainder λC3 of the communications signal λC1 is no more than 0.2% of the original communications signal λC1. In certain implementations, the remainder λC3 of the communications signal λC1 is no more than 0.1% of the original communications signal λC1.

As further shown in FIG. 14, the reflector component 730 may be either transmissive to or reflective of the remainder λC3 of the communications signal λC1. In some examples, at least a portion λC4 of the remainder communications signal λC3 propagates through the reflector component 730. Accordingly, that portion λC4 does not propagate back down the fiber 702 to the test signal receiver. Even if the reflector component 730 is transmissive, a small percentage of the remainder communications signal λC3 may be reflected back along the fiber 702 as a second reflected signal λC5.

In certain implementations, at least 80% of the remainder communications signal λC3 passes through the reflector component 730 as signal λC4. In certain implementations, at least 90% of the remainder communications signal λC3 passes through the reflector component 730. In certain implementations, at least 95% of the remainder communications signal λC3 passes through the reflector component 730. In certain implementations, at least 98% of the remainder communications signal λC3 passes through the reflector component 730. In certain implementations, at least 99% of the remainder communications signal λC3 passes through the reflector component 730. In certain implementations, at least 99.5% of the remainder communications signal λC3 passes through the reflector component 730. In certain implementations, at least 99.7% of the remainder communications signal λC3 passes through the reflector component 730. In certain implementations, at least 99.8% of the remainder communications signal λC3 passes through the reflector component 730. In certain implementations, at least 99.9% of the remainder communications signal λC3 passes through the reflector component 730.

Accordingly, the second reflected communications signal λC5 is no more than 20% of the remainder communications signal λC3. In certain implementations, the second reflected communications signal λC5 of the communications signal λC1 is no more than 10% of the remainder communications signal λC3. In certain implementations, the second reflected communications signal λC5 of the communications signal λC1 is no more than 5% of the remainder communications signal λC3. In certain implementations, the second reflected communications signal λC5 of the communications signal λC1 is no more than 2% of the remainder communications signal λC3. In certain implementations, the second reflected communications signal λC5 of the communications signal λC1 is no more than 1% of the remainder communications signal λC3. In certain implementations, the second reflected communications signal λC5 of the communications signal λC1 is no more than 0.5% of the remainder communications signal λC3. In certain implementations, the second reflected communications signal λC5 of the communications signal λC1 is no more than 0.3% of the remainder communications signal λC3. In certain implementations, the second reflected communications signal λC5 of the communications signal λC1 is no more than 0.2% of the remainder communications signal λC3. In certain implementations, the second reflected communications signal λC5 of the communications signal λC1 is no more than 0.1% of the remainder communications signal λC3.

In other examples, the reflector component 730 reflects a majority of the remainder communications signal λC3 back towards the front of the ferrule 704 as second reflected signal λC5. In certain implementations, the reflector component 730 reflects the remainder communications signal λC3 at the same ratio as the test signal λT. In certain implementations, the reflector component 730 is a full wavelength reflective film. Accordingly, both the remainder communications signal λC3 and the test signal λT are reflected to propagate back down the fiber 702 toward the front of the ferrule 704.

As further shown in FIG. 14, the filtration film 740 reflects a portion λC6 of the second reflected communications signal λC5 away from the front of the ferrule 702. This portion λC6 also is directed to the cladding of the fiber 702 or otherwise directed away from the transmissible portion of the fiber 702. Accordingly, this reflected portion λC6 does not propagate back down the fiber 702 to the test signal receiver.

In certain implementations, the filtration film 740 reflects the same percentage of the reflected communications signal λC5 as the filtration film 740 reflected from the original communications signal λC1. In certain implementations, the filtration film 740 reflects at least a majority of the reflected communications signal λC5 away from the transmissive part of the fiber.

In certain examples, the filtration film 740 reflects at least 95% of the reflected communications signal λC5 away from the transmissive part of the fiber. In certain examples, the filtration film 740 reflects at least 98% of the reflected communications signal λC5 away from the transmissive part of the fiber. In certain examples, the filtration film 740 reflects at least 99% of the reflected communications signal λC5 away from the transmissive part of the fiber. In certain examples, the filtration film 740 reflects at least 99.5% of the reflected communications signal λC5 away from the transmissive part of the fiber. In certain examples, the filtration film 740 reflects at least 99.5% of the reflected communications signal λC5 away from the transmissive part of the fiber. In certain examples, the filtration film 740 reflects at least 99.8% of the reflected communications signal λC5 away from the transmissive part of the fiber. In certain examples, the filtration film 740 reflects at least 99.9% of the reflected communications signal λC5 away from the transmissive part of the fiber.

Accordingly, a second remainder λC7 of the second reflected communications signal λC5 is no more than 5% of the second reflected communications signal λC5. In certain implementations, the second remainder λC7 is no more than 2% of the second reflected communications signal λC5 In certain implementations, the remainder λC7 is no more than 1% of the second reflected communications signal λC5. In certain implementations, the second remainder λC7 is no more than 0.5% of the second reflected communications signal λC5. In certain implementations, the remainder λC7 is no more than 0.3% of the second reflected communications signal λC5. In certain implementations, the remainder λC7 is no more than 0.2% of the second reflected communications signal λC5. In certain implementations, the remainder λC7 is no more than 0.1% of the second reflected communications signal λC5.

Accordingly, the remaining portion λC7 of the communications signal that propagates back down the fiber 702 towards the test signal receiver is less than 1% of the original communications signal λC1. In certain implementations, the remaining portion λC7 is less than 0.1% of the original communications signal λC1. In certain implementations, the remaining portion λC7 is less than 0.01% of the original communications signal λC1. In certain implementations, the remaining portion λC7 is less than 0.001% of the original communications signal λC1. In certain implementations, the remaining portion λC7 is less than 0.0001% of the original communications signal λC1. In certain implementations, the remaining portion λC7 is less than 0.00001% of the original communications signal λC1. In certain implementations, the remaining portion λC7 is less than 0.000001% of the original communications signal λC1.

In certain implementations, the return loss for the communications band at the optical testing device 700 is at least 40 dB. In certain implementations, the return loss for the communications band at the optical testing device 700 is at least 45 dB. In certain implementations, the return loss for the communications band at the optical testing device 700 is at least 48 dB. In certain implementations, the return loss for the communications band at the optical testing device 700 is at least 50 dB.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the claimed invention and the general inventive concept embodied in this application that do not depart from the broader scope.

What is claimed:

1. An optical testing device suitable for being plugged into a port at which optical signals can be received, the optical signals having a communications wavelength band and a testing wavelength band that is different from the communications wavelength band, the optical testing device comprising:
    a ruggedized optical connector including a plug body surrounding a ferrule holding an optical fiber, the ferrule extending between a front end and a rear end, the ferrule being mounted within the plug body, the front end of the ferrule being a free end that is accessible at a front end of the plug body, the rear end of the ferrule positioned within the plug body, the optical fiber having an end face accessible at the front end of the ferrule and a rear extending at least to the rear end of the ferrule;
    a seal surrounding the plug body to seal the port, the seal comprising an O-ring;
    a reflector component carried with the optical connector, the reflector component positioned at the rear of the optical fiber, the reflector component being reflective at the testing wavelength band; and
    a filtration film disposed at the front end of the ferrule, the filtration film coating the front end of the ferrule, the filtration film being transmissive at the testing wavelength band and being substantially less transmissive at the communications wavelength band than at the testing wavelength band.

2. The optical testing device of claim 1, wherein the reflector component is transmissive at the communications wavelength band.

3. The optical testing device of claim 1, wherein the reflector component is also reflective at the communications wavelength band.

4. The optical testing device of claim 1, wherein the reflector component includes a reflective film disposed at the rear end of the ferrule.

5. The optical testing device of claim 1, wherein the reflector component includes a Bragg grating reflector disposed on the optical fiber within the ferrule.

6. The optical testing device of claim 1, wherein the reflector component includes a separate reflective component that is spliced to the rear of the optical fiber.

7. The optical testing device of claim 6, wherein the separate reflective component includes a Bragg grating reflector.

8. The optical testing device of claim 1, wherein the front end of the ferrule is angled.

9. The optical testing device of claim 1, wherein the plug body is ruggedized.

10. The optical testing device of claim 9, wherein the plug body includes a twist-to-lock fastener.

11. The optical fiber testing device of claim 10, wherein the twist-to-lock fastener comprises a threaded fastener.

12. The optical fiber testing device of claim 10, wherein the twist-to-lock fastener comprises a bayonet fastener.

13. The optical testing device of claim 1, wherein the optical testing device creates a return loss at the communications wavelength band of at least about 50 dB.

14. The optical testing device of claim 1, wherein the ruggedized optical connector is secured to the port with a twist-to-lock fastener.

15. The optical testing device of claim 1, wherein the optical testing device is a passive device.

16. The optical testing device of claim 1, wherein the reflector component is positioned at the rear end of the ferrule.

17. The optical testing device of claim 1, wherein a ferrule hub holding the rear end of the ferrule with a spring push is positioned at a rear of the ferrule hub; the spring push engaging a spring disposed between the ferrule hub and the spring push, the spring biasing the ferrule away from the spring push.

18. An optical fiber testing device, comprising:
an optical fiber supported by a ferrule, the ferrule including a front end and a rear end;
  a ruggedized optical fiber connector that is removably, securable to a ruggedized port of an optical fiber terminal, the ruggedized optical fiber connector enabling optical coupling with an optical adapter within the ruggedized port when the ruggedized optical fiber connector is secured to the ruggedized port, the rear end of the ferrule mounted within a plug body of the ruggedized optical fiber connector, the front end of the ferrule being a free end that is accessible at a front end of the plug body;
  a seal carried by the plug body sealing the ruggedized port, the seal comprising an O-ring;
  a reflector component that returns, through the optical fiber, an optical signal delivered through the optical fiber, the reflector component positioned at a rear end of the optical fiber.

19. The optical fiber testing device of claim 18, wherein the optical fiber testing device is in the form of a dongle.

20. The optical fiber testing device of claim 19, wherein the ruggedized optical fiber connector is connected at a front end of the optical fiber and wherein the reflector component is housed in a reflector housing at the rear end of the optical fiber.

21. The optical fiber testing device of claim 18, wherein the optical fiber testing device comprises a ruggedized connector assembly.

22. The optical fiber testing device of claim 21, wherein both the optical fiber and the reflector component are housed within the ruggedized connector assembly.

23. The optical fiber testing device of claim 18, wherein the reflector component comprises a commercially available reflector that is optically coupled to the optical fiber.

24. The optical fiber testing device of claim 18, wherein the reflector component comprises a Bragg grating, a reflective coating, or a thin film filter included in or on the optical fiber.

25. The optical fiber testing device of claim 18, wherein the reflector component comprises a separate portion of optical fiber spliced to the optical fiber, the separate portion of optical fiber including a Bragg grating, a reflective coating, or a thin film filter.

26. The optical fiber testing device of claim 18, wherein the optical fiber has a front end disposed at the front end of the ferrule and the rear end of the optical fiber does not extend beyond the rear end of the ferrule, the reflector component including a coating applied to the rear end of the optical fiber.

27. The optical fiber testing device of claim 26, wherein the coating includes a plurality of layers of the coating.

28. The optical fiber testing device of claim 27, wherein at least one of the layers has a different index of reflection than another one of the layers.

29. The optical fiber testing device of claim 28, wherein at least one of the layers has a different thickness than another one of the layers.

30. The optical fiber testing device of claim 28, wherein at least one of the layers has a different material composition than another one of the layers.

31. The optical fiber testing device of claim 18, wherein the ruggedized optical fiber connector comprises a ruggedized LC connector, a ruggedized SC connector, a ruggedized FC connector, a ruggedized MT connector, or a ruggedized ST connector.

32. The optical fiber testing device of claim 18, wherein the ruggedized optical connector is secured to the ruggedized port of the optical fiber terminal with a twist-to-lock fastener.

33. An optical testing device suitable for being plugged into a port at which optical signals can be received, the optical signals having a communications wavelength band and a testing wavelength band that is different from the communications wavelength band, the optical testing device comprising:
  an optical connector including a plug body surrounding a ferrule holding an optical fiber, the ferrule extending between a front end and a rear end, the optical fiber having an end face accessible at the front end of the ferrule and a rear extending at least to the rear end of the ferrule, the ferrule positioned between a reflector component and a filtration film.

34. The optical testing device of claim 33, wherein the reflector component is positioned at the rear end of the ferrule.

35. The optical testing device of claim 33, wherein the filtration film is positioned at the front end of the ferrule.

* * * * *